United States Patent
Weintraub et al.

(10) Patent No.: US 9,075,976 B2
(45) Date of Patent: Jul. 7, 2015

(54) SYSTEMS AND METHODS FOR CONTROLLING ACCESS TO MEDIA CONTENT BY DETECTING ONE OR MORE USER FINGERPRINTS

(71) Applicant: Verizon Services Organization Inc., Arlington, VA (US)

(72) Inventors: Michael Alan Weintraub, Medfield, MA (US); William E. Garrett, Framingham, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/788,636

(22) Filed: Mar. 7, 2013

(65) Prior Publication Data
US 2013/0263253 A1   Oct. 3, 2013

Related U.S. Application Data

(63) Continuation of application No. 11/566,519, filed on Dec. 4, 2006, now Pat. No. 8,408,456.

(51) Int. Cl.
| | |
|---|---|
| *G06K 5/00* | (2006.01) |
| *G06K 9/00* | (2006.01) |
| *G06F 21/32* | (2013.01) |
| *G06F 3/044* | (2006.01) |
| *G06F 21/60* | (2013.01) |

(52) U.S. Cl.
CPC ............ *G06F 21/32* (2013.01); *G06F 3/044* (2013.01); *G06F 21/60* (2013.01); *G06F 2203/0338* (2013.01); *G06F 2221/2149* (2013.01); *G06K 9/0002* (2013.01)

(58) Field of Classification Search
USPC .......................................... 235/382; 382/124
See application file for complete search history.

(56) References Cited

U.S. PATENT DOCUMENTS

| | | | | |
|---|---|---|---|---|
| 5,325,442 | A * | 6/1994 | Knapp ......................... | 382/124 |
| 5,420,936 | A * | 5/1995 | Fitzpatrick et al. ........... | 382/124 |
| 6,327,376 | B1 * | 12/2001 | Harkin .......................... | 382/124 |
| 2002/0059588 | A1 * | 5/2002 | Huber et al. .................... | 725/35 |
| 2003/0108227 | A1 * | 6/2003 | Philomin et al. .............. | 382/124 |
| 2004/0179723 | A1 * | 9/2004 | Sano et al. .................... | 382/124 |

* cited by examiner

*Primary Examiner* — Daniel Hess

(57) ABSTRACT

A system includes a media content processing subsystem and user input device having a plurality of control surfaces each configured to cause the input device to transmit at least one command to the media content processing subsystem. The input device is configured to acquire an image of a fingerprint of a finger touching the control surface and cause the processing subsystem to execute the command in accordance with a user profile that corresponds to the acquired fingerprint image.

24 Claims, 16 Drawing Sheets

| FINGERPRINT IMAGE DATABASE | | |
|---|---|---|
| Fingerprint | User Name | User Profile |
| 🔘 | Mike | Full Access |
| 🔘 | Sally | Sally's Profile |
| 🔘 | John | Child |
| 🔘 | John | Child |
| 🔘 | Sarah | Teen |
| | (Add)  (Edit) | |

Fig. 10

SYSTEMS AND METHODS FOR CONTROLLING ACCESS TO MEDIA CONTENT BY DETECTING ONE OR MORE USER FINGERPRINTS

CROSS REFERENCE TO RELATED APPLICATIONS

This application is a continuation of U.S. patent application Ser. No. 11/566,519, filed on Dec. 4, 2006, which is hereby incorporated by reference in its entirety.

BACKGROUND INFORMATION

The advent of computers, interactive electronic communication, the Internet, and other advances in the digital realm of consumer electronics have resulted in a great variety of enhanced programming, recording, and viewing options for users who view media content such as television programs. In implementing such enhanced options, the set-top box ("STB") has become an important computing device for accessing media content services and the media content within those services. In addition to supporting traditional analog broadcast video functionality, STBs also support an increasing number of two-way digital services such as video-on-demand, internet protocol television ("IPTV"), and personal video recording.

An STB is typically connected to a cable or satellite, or generally, a subscriber television system, and includes hardware and software necessary to provide enhanced options for a subscriber television system at a subscriber location. Conventional STBs include a processor, communication components, and memory and are connected to a television or other display device, such as a personal computer. While many STBs are stand-alone devices that are externally connected to a television, an STB and/or its functionality may be integrated into a television or personal computer, a mobile device such as a mobile phone or a personal digital assistant ("PDA"), or even into an audio device such as a programmable radio, as is known.

An STB is usually configured to provide users with a large number and variety of media content choices. For example, a user may choose to access a variety of broadcast television programs, pay-per-view services, video-on-demand programming, Internet services, and audio programming via an STB.

With such a wide variety of available media content, it is often desirable to restrict or block certain media content instances deemed inappropriate to minors and others. Moreover, it may be desirable to completely restrict access to any of the functions of an STB for one or more unauthorized users.

Parental control devices, such as V-chips, allow a parent or guardian to automatically block media content instances that contain material considered to be inappropriate to minors such as, but not limited to, sexually explicit material, violence, profanity, etc. However, many parental control devices are often cumbersome to program and are often easily bypassed. Moreover, parents or other authorized users often have to enter an access code or perform some other inconvenient task in order to access blocked programming.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

FIG. 10 illustrates an exemplary graphical user interface configured to allow a user to enter one or more fingerprint images into a database and/or associate one or more of the fingerprint images that are within the database with one or more user profiles according to principles described herein.

DETAILED DESCRIPTION OF EXEMPLARY EMBODIMENTS

Exemplary systems and methods for accessing one or more media content instances via a media content processing subsystem (e.g., a set-top box or a television set) are described herein. As used herein, the term "media content instance" will be used to refer generally to any television program, on demand program, pay-per-view program, broadcast media program, IPTV, commercial, advertisement, video, movie, song, image, photograph, sound, or any segment of these or other forms of media content that may be experienced or viewed by a user.

The exemplary systems and methods described herein generally enable a media content experience to be customized for different users of a media content processing subsystem. The term "customizing a media content experience" and variations thereof will be used herein to refer to setting one or more viewing preferences for a user, restricting access to one or more media content instances for the user, allowing access to one or more media content instances for the user, and/or otherwise customizing the interaction between the media content processing subsystem and the user.

In some examples, a user input device may be provided that includes at least a plurality of control surfaces each configured to cause the input device to transmit at least one command to the media content processing subsystem, When a user touches one of the control surfaces with a finger to transmit a command to the processing subsystem, the input device acquires an image of a fingerprint of the finger while the finger is touching the control surface and causes the processing subsystem to execute the command in accordance with a user profile that corresponds to the acquired fingerprint image. As used herein, the term "user profile" refers to a set of one or more customized or personalized settings that affect any aspect of media content that may be accessed via the media content processing subsystem.

Components and functions of the exemplary systems and methods described herein will now be described in more detail.

Figure 1:
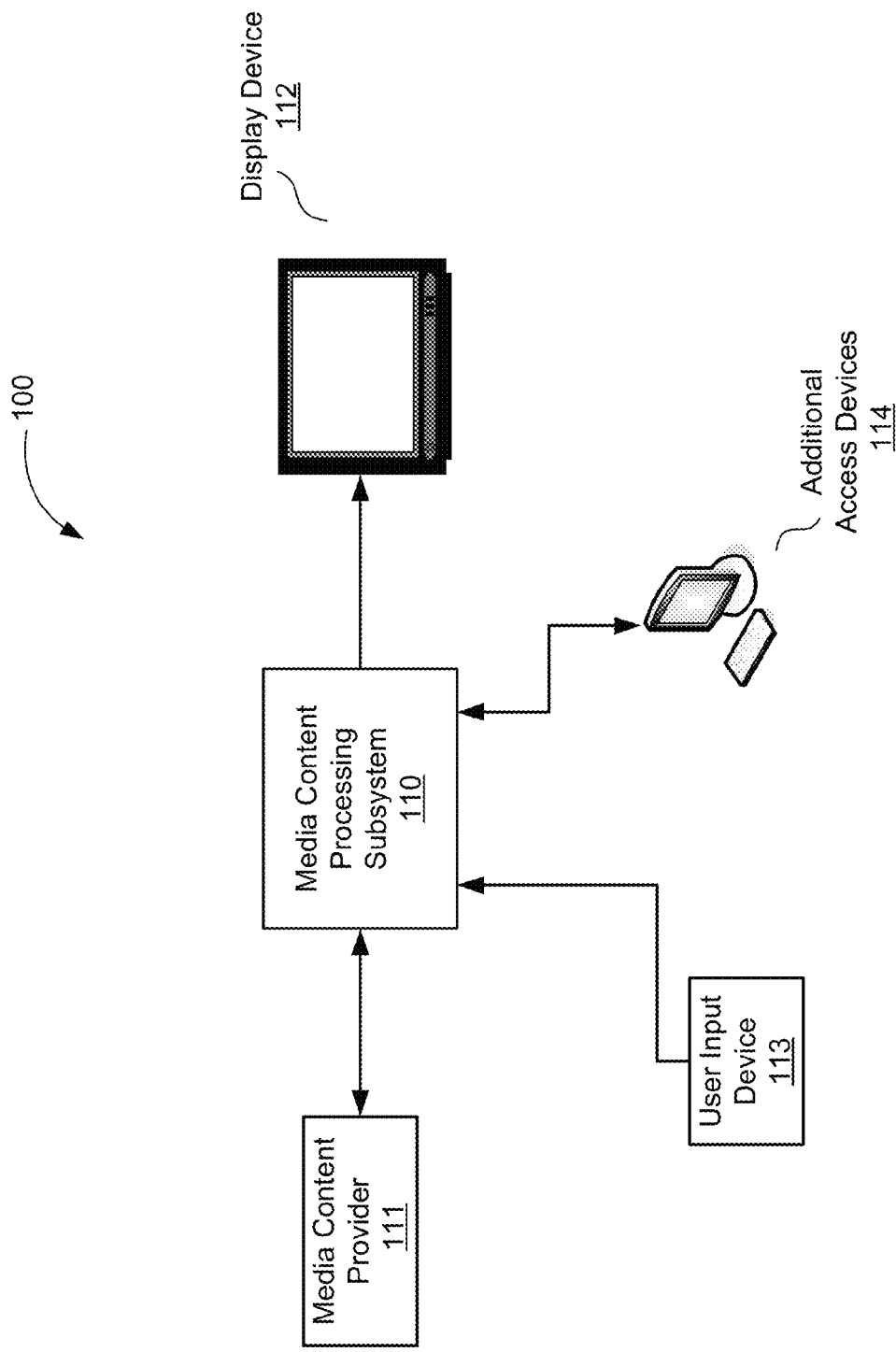
FIG. 1 illustrates an example of a media content access system according to principles described herein.

FIG. 1 illustrates an exemplary media content access system 100. Media content access system 100 may take many different forms and include multiple and/or alternate components and facilities.

As shown in FIG. 1, a media content processing subsystem 110 is configured to communicate with and receive a signal or data stream (e.g., a media content stream) containing a media content instance from a media content provider 111. The media content processing subsystem 110 and media content provider 111 may communicate using any known communication technologies, devices, media, and protocols supportive of remote data communications, including, but not limited to, cable networks, subscriber television networks, satellite networks, the Internet, intranets, local area networks, wireless networks (e.g., mobile telephone networks), optical fiber networks, data transmission media, communications devices, Transmission Control Protocol ("TCP"), Internet Protocol ("IP"), File Transfer Protocol ("FTP"), telnet, Hypertext Transfer Protocol ("HTTP"), socket connections, Ethernet, and other suitable communications networks and technologies.

The media content processing subsystem 110 may use any suitable technology or technologies to receive the media content instance from the media content provider 111, including using a tuner to receive the media content instance, as described below. The media content processing subsystem 110 may be configured to process the media content stream provided by the media content provider 111, including causing the media content instance, or one or more components (e.g., video and/or audio components) of the media content instance, to be presented for experiencing (e.g., viewing) by a user. The presentation of the media content instance may include, but is not limited to, displaying, playing back, or otherwise processing the media content instance, or one or more components of the media content instance, such that it may be experienced by the user. For example, the media content processing subsystem 110 may provide a signal to a display device 112 (e.g., a television, computer monitor, etc.) so that the display device 112 may present (e.g., display) the media content instance for experiencing by the user.

As shown in FIG. 1, and as will be described in more detail below, the media content processing subsystem 110 may be controlled by a user input device 113 (e.g., a remote control device) and/or a number of additional access devices 114 (e.g., a personal computer, wireless device, mobile phone, etc.).

While an exemplary media content access system 100 is shown in FIG. 1, the exemplary components illustrated in FIG. 1 are not intended to be limiting. Indeed, additional or alternative components and/or implementations may be used, as is well known. Each of the components of system 100 will now be described in additional detail.

Media content provider 111 is configured to provide various types of media content via a satellite, cable system, subscriber television network, the Internet, optical fiber network, wireless network, or any other suitable network. The media content may include, but is not limited to audio-visual content (e.g., broadcast television programs, pay-per-view services, Internet Protocol Television ("IPTV"), Digital Video Disc ("DVD") related content, or video-on-demand programming), pre-recorded media content, data communication services such as Internet services, images, and audio programming.

Figure 2:
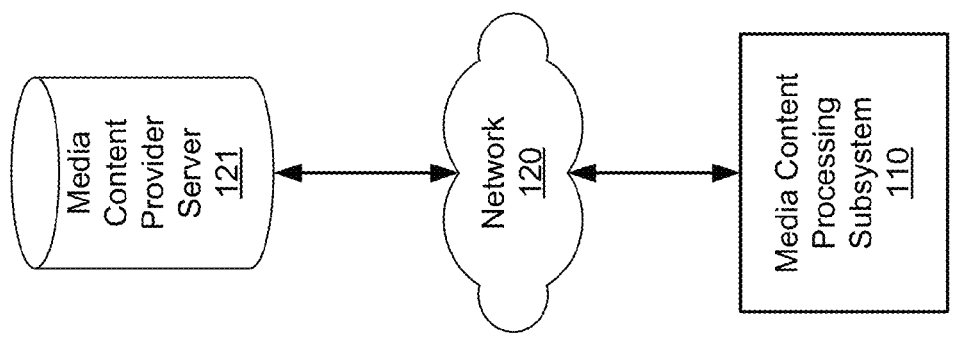
FIG. 2 is an illustration of an exemplary media content provider network according to principles described herein.

An exemplary media content provider 111 includes a media content provider server 121, as shown in FIG. 2. The media content provider server 121 may be configured to communicate with the media content processing subsystem 110 via one or more types of networks 120 (and communications links thereto). The network 120 shown in FIG. 2 may include the Internet, an intranet or other private packet-switched network, a cable television network (e.g., hybrid fiber-coax network), a wireless broadcast network (e.g., a satellite media broadcasting network or terrestrial broadcasting network), a telephone network, a provider-specific network (e.g., a Verizon® FIOS® network and/or a TiVo® network), an optical fiber network, or any other suitable network. In some alternative examples, the processing subsystem 110 may be connected directly to the media content provider server 121.

As mentioned, the processing subsystem 110 may be coupled to a display device 112 configured to present media content to a user. For example, the display device 112 may display or play the media content. The display device 112 may include, but is not limited to, a television, computer monitor, mobile phone, handheld device, or any other device configured to present media content to a user.

Figure 3:
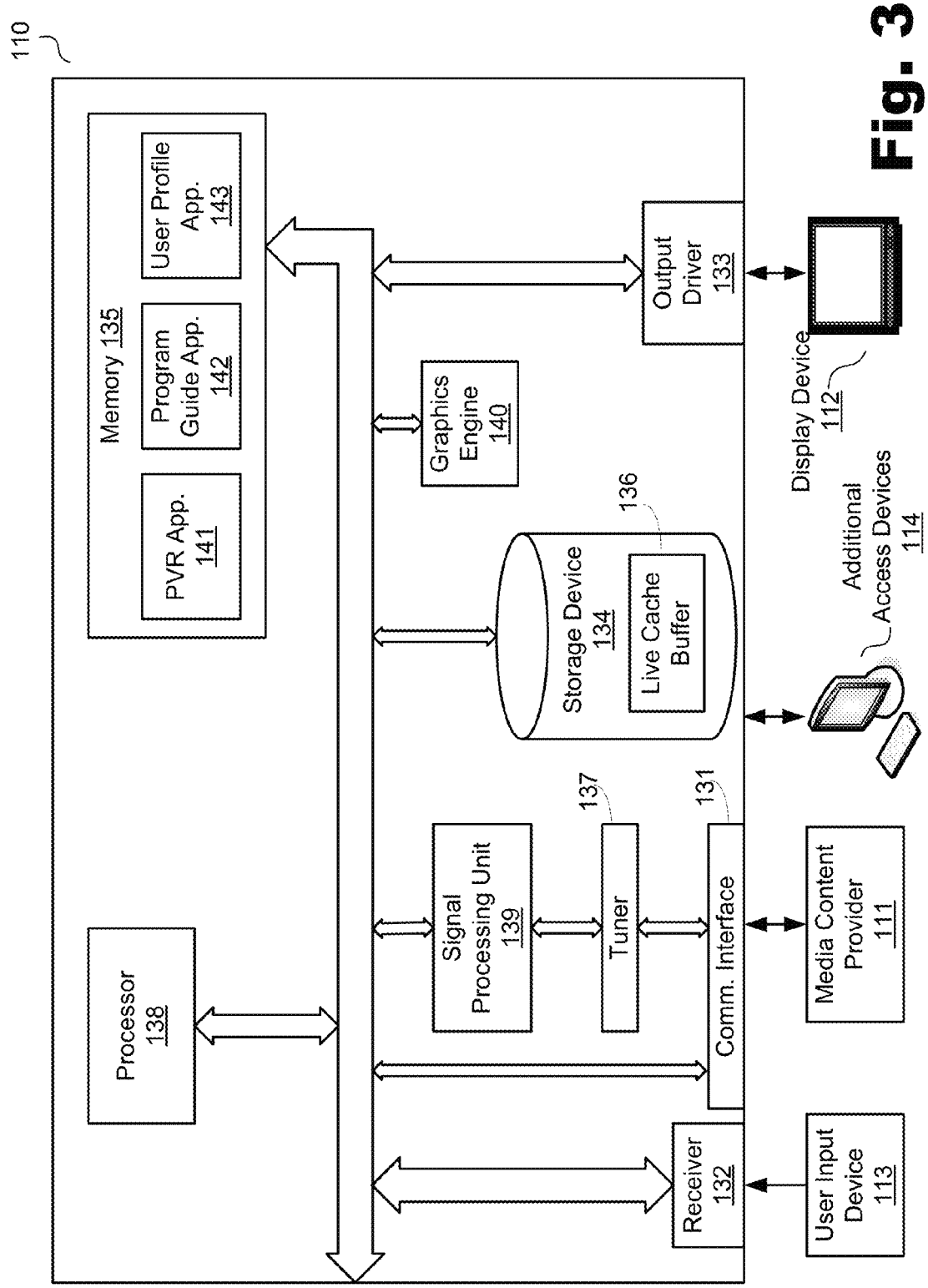
FIG. 3 is a block diagram of an exemplary media content processing subsystem according to principles described herein.

FIG. 3 is a block diagram of an exemplary media content processing subsystem 110 (or simply "processing subsystem 110"). The processing subsystem 110 may include any combination of hardware, software, and firmware configured to process an incoming media content stream. As used herein and in the appended claims, unless otherwise specifically denoted, the terms "media content processing subsystem" and "processing subsystem" will be used to refer expansively to all possible devices that receive and process digital and/or analog media content. Hence, an exemplary processing subsystem 110 may include, but is not limited to, a set-top box ("STB"), a home communication terminal ("HCT"), a digital home communication terminal ("DHCT"), a stand-alone personal video recorder ("PVR"), a television set, a DVD player, a video-enabled phone, and/or a personal computer.

In some examples, the processing subsystem 110 may include any computer hardware and/or instructions (e.g., software programs), or combinations of software and hardware, configured to perform the processes described herein. In particular, it should be understood that processing subsystem 110 may be implemented on one physical computing device or may be implemented on more than one physical computing device. Accordingly, processing subsystem 110 may include any one of a number of computing devices, and may employ any of a number of computer operating systems, including, but not limited to, known versions and/or varieties of the Microsoft Windows® operating system, the UNIX operating system, Macintosh® operating system, and the Linux® operating system.

Accordingly, the processes described herein may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary processing subsystem 110 is shown in FIG. 3, the exemplary components illustrated in FIG. 3 are not intended to be limiting. Indeed, additional or alternative components and/or implementations may be used. Various components of the processing subsystem 110 will now be described in additional detail.

In some examples, the processing subsystem 110 may include a communication interface 131 configured to receive media content in any format from the media content provider 111 or from any other suitable media content source. The communication interface 131 may include any device, logic, and/or other technologies suitable for receiving signals and/or data representative of media content. In some examples, the communication interface 131 may include a single port configured to receive media content from the media content provider 111 and/or from any other source (e.g., from another processing subsystem, another server, etc.) For example, the communication interface 131 may include or be connected to a broadband connection, which can enable the processing subsystem 110 to receive media content on a single port from multiple sources. In other examples, multiple ports may be used. The communication interface 131 may be configured to interface with any suitable communication media, protocols, and formats, including any of those mentioned above.

The processing subsystem 110 may also include a receiver 132 configured to receive one or more input commands from one or more user input devices 113. An exemplary user input device 113 will be described in more detail below.

A number of additional access devices 114 may also be configured to communicate with the processing subsystem 110. These access devices 114 may include, but are not limited to, personal computers and mobile devices (e.g., laptops, PDAs, cellular phones, etc.). In some examples, the access devices 114 may be configured to access content stored and/or processed by the processing subsystem 110. For example, media content that has been recorded by the processing subsystem 110 may be accessed and viewed on a personal computer. Moreover, the additional access devices 114 may be used to program or otherwise control the functions of the processing subsystem 110.

The processing subsystem 110 may also include an output driver 133 configured to interface with or drive the display device 112. The output driver 133 may include any combination of hardware, software, and firmware as may serve a particular application.

As shown in FIG. 3, a storage device 134 may also be included within the processing subsystem 110. In some examples, the storage device 134 may include one or more data storage media, devices, or configurations and may employ any type, form, and combination of storage media. For example, the storage device 134 may include, but is not limited to, a hard drive, network drive, flash drive, magnetic disc, optical disc, or other non-volatile storage unit. Various portions of media content may be temporarily and/or permanently stored in the storage device 134.

The storage device 134 of FIG. 3 is shown to be a part of the processing subsystem 110 for illustrative purposes only. It will be understood that the storage device 134 may additionally or alternatively be located external to the processing subsystem 110.

The processing subsystem may also include memory 135. Memory 135 may include, but is not limited to, FLASH memory, random access memory (RAM), dynamic RAM (DRAM), or a combination thereof. In some examples, as will be described in more detail below, various applications used by the processing subsystem 110 may reside in memory 135.

As shown in FIG. 3, the storage device 134 may include one or more live cache buffers 136. The live cache buffer 136 may additionally or alternatively reside in memory 135 or in a storage device external to the processing subsystem 110. In some examples, media content data may be temporarily stored in the live cache buffer 136 to facilitate viewing of the media content in one or more trick play modes.

The storage device 134 may also include a tuner 137. Tuner 137 is configured to tune to a particular television channel, stream, address, frequency or other carrier (i.e., content carrier) in order to process media content that is transmitted on that carrier. In some examples, the tuner 137 may include multiple tuners such that multiple carriers of media content may be processed and/or shown on a display device 112. For example, the tuner 137 may include a first tuner configured to receive an analog video signal corresponding to a first media content instance and a second tuner configured to simultaneously receive a digital compressed stream corresponding to a second media content instance. It will be recognized that the tuner 137 may have any number of tuners configured to receive any kind of media content.

In some examples, media content received at the tuner 137 is temporarily buffered, or stored, in the live cache buffer 136.

If there are multiple tuners 137, there may be a live cache buffer 136 corresponding to each of the tuners 137. Once media content is temporarily stored in the live cache buffer 136, the user may then designate whether the media content is to be permanently stored as a permanent recording in the storage device 134 or whether the media content is to be deleted. As used herein, the term "permanent recording" will be understood to mean media content that is stored for an extended period of time as decided by the user.

As shown in FIG. 3, the processing subsystem 110 may include one or more processors, such as processor 138, configured to control the operations of the processing subsystem 110. The processing subsystem 110 may also include a signal processing unit 139 configured to process incoming media content. The signal processing unit 139 may be configured, for example, to demodulate and parse encoded digital media content. In some examples, the processing subsystem 110 may include one or more signal processing units 139 corresponding to each of the tuners 137.

In some examples, if the incoming media content is in the form of IP data packets (e.g., in IPTV configurations), the media content may be processed directly by the processor 138 and/or any other processor configured to process IP data packets.

The processing subsystem 110 may also include a graphics engine 140 configured to generate graphics that are to be displayed by the display device 112. The graphics may include graphical user interfaces ("GUIs") such as, but not limited to, one or more program guides, progress bars, and other graphics.

Also shown in FIG. 3 are one or more applications 141-143 that may be included within the processing subsystem 110. These applications 141-143, or application clients, may reside in memory 135 or in any other area of the processing subsystem 110 and be executed by the processor 138. The applications 141-143 shown in FIG. 3 are merely illustrative of the many different applications that may reside within the processing subsystem 110.

As shown in FIG. 3, one of the applications may include a personal video recording (PVR) application 141. A PVR application is also referred to as a digital video recording (DVR) application. As used herein, the term "PVR application" will be used to refer to any application or device configured to record media content and/or provide for the viewing of media content in trick play mode. As previously mentioned, trick play modes include, but are not limited to, slow motion, fast motion, reverse play, fast forward play, instant replay, jumping, pausing of live broadcast, and scanning. The PVR application 141 may also provide for media content recording functionality by enabling the temporary and/or permanent recording of media content to the storage device 134.

The processing subsystem 110 may additionally or alternatively include a program guide application 142 configured to generate a program guide that is displayed on the display device 112. An exemplary program guide includes a GUI that performs various functions including allowing a user to select and/or view information and options associated with various media content instances.

In some examples, the processing subsystem 110 includes a user profile application 143 configured to enable a user to program one or more user profiles within the processing subsystem 110. Additionally or alternatively, the user profile application 143 may be configured to enable a user to associate one or more fingerprint images with one or more user profiles. As mentioned previously, a user profile may include one or more customized or personalized settings that affect any aspect of media content that may be accessed via the processing subsystem 110. For example, as will be described in more detail below, a user profile may include a "whitelist" specifying one or more accessible media content instances, a "blacklist" specifying one or more media content access restrictions, customized display settings, and/or any other customized setting.

In some examples, a user may control the processing subsystem 110 with a user input device 113 (or simply "input device 113"). The input device 113 may include, for example, a remote control, keyboard, mouse, or any other suitable input device. In some examples, the input device 113 may include a transmitter configured to communicate with the receiver 132 of the processing subsystem 110 via a wireless link, electrical connection, or any other suitable communication link.

Figure 4:
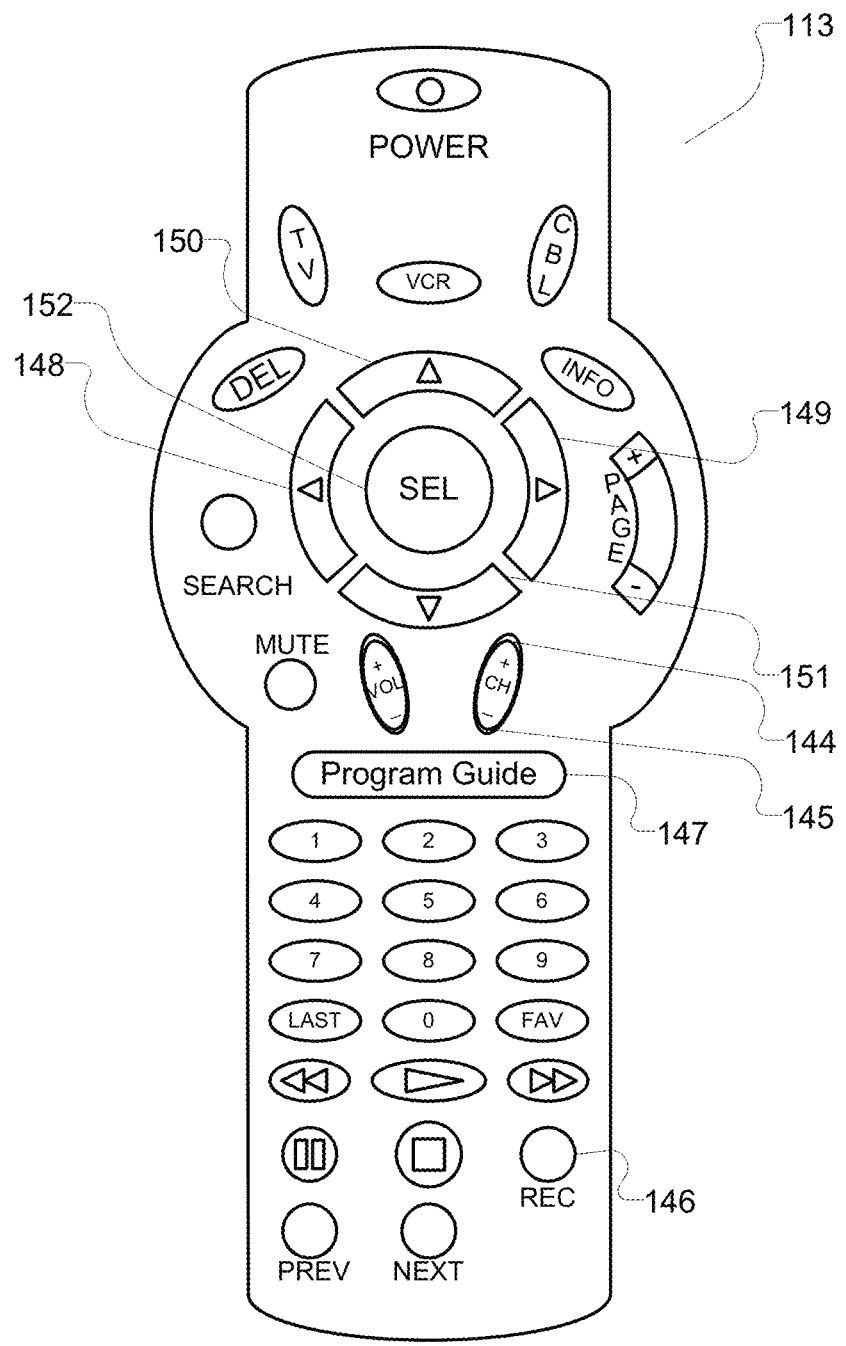
FIG. 4 illustrates an exemplary user input device according to principles described herein.

An exemplary remote control input device 113 is illustrated in FIG. 4. It will be recognized that the input device 113 shown in FIG. 4 is merely illustrative of the many different types of input devices that may be used in connection with the systems and methods described herein.

In some examples, the input device 113 may include one or more control surfaces configured to enable a user to control various options related to media content available via the processing subsystem 110. As used herein, the term "control surface" refers to any button, key, or other surface that, when selected by a user, causes the input device 113 to transmit a command to the processing subsystem 110. A user may "select" a control surface by touching and/or pressing the control surface.

A number of control surfaces are illustrated in FIG. 4. For example, channel up and down buttons 144 and 145 enable a user to navigate to and between various media content instances. A record button 146 may also be included which enables the user to designate as permanently recorded any media content instance buffered in the live cache buffer 136. A program guide button 147 may be configured to evoke the display of a program guide on the display device 112. A left button 148, right button 149, up button 150, down button 151, and select button 152 may also be included and configured to enable the user to evoke and/or navigate through various views and graphical user interfaces displayed by the display device 112.

Many input devices, such as the remote control input device 113 shown in FIG. 4, communicate with the processing subsystem 110 by transmitting infrared ("IR") commands that are detected and decoded by the processing subsystem 110. However, it will be recognized that the input device 113 may be configured to transmit commands to the processing subsystem 110 using any other suitable communication link.

In some examples, each control surface that is a part of the input device 113 corresponds to a unique control code or binary word. Hence, when a particular control surface is selected, a control code corresponding to that control surface is included within the command that is transmitted to the processing subsystem 110. The processing subsystem 110 may then recognize which control surface was selected by detecting and decoding the unique control code.

To illustrate, Table 1 shows an exemplary 8-bit encoding scheme that may be used to represent various control surfaces that are a part of the input device 113. It will be recognized that the encoding scheme shown in Table 1 is merely illustrative of the many different encoding schemes that may be used to represent the various control surfaces that may be a part of the input device 113. Moreover, it will be recognized that the length of each control code or encoding representation may also vary as may serve a particular application.

TABLE 1

| Input Device Control Surface | Control Code |
| --- | --- |
| 1 | 0000 0000 (0) |
| 2 | 0000 0001 (1) |
| 3 | 0000 0010 (2) |
| 4 | 0000 0011 (3) |
| 5 | 0000 0100 (4) |
| 6 | 0000 0101 (5) |
| 7 | 0000 0110 (6) |
| 8 | 0000 0111 (7) |
| 9 | 0000 1000 (8) |
| 0 | 0000 1001 (9) |
| Select | 0000 1011 (11) |
| Channel up | 0001 0000 (16) |
| Channel down | 0001 0001 (17) |
| Volume up | 0001 0010 (18) |
| Volume down | 0001 0011 (19) |
| Power on | 0001 0101 (21) |
| Power off | 0010 1111 (47) |
| Mute | 0001 0100 (20) |

As shown in Table 1, each control surface that is a part of the input device 113 corresponds to a unique 8-bit control code. The decimal equivalent to each 8-bit control code is shown in parenthesis in Table 1 for illustrative purposes. When a particular control surface is selected, the input device 113 transmits the control word corresponding to that control surface to the processing subsystem 110. For example, if the user presses the channel up button 144, the input device 113 transmits a "00010000" to the processing subsystem 110. The processing subsystem 110 is configured to recognize the transmitted control word and execute or perform the specified command (e.g., channel up).

Figure 5:
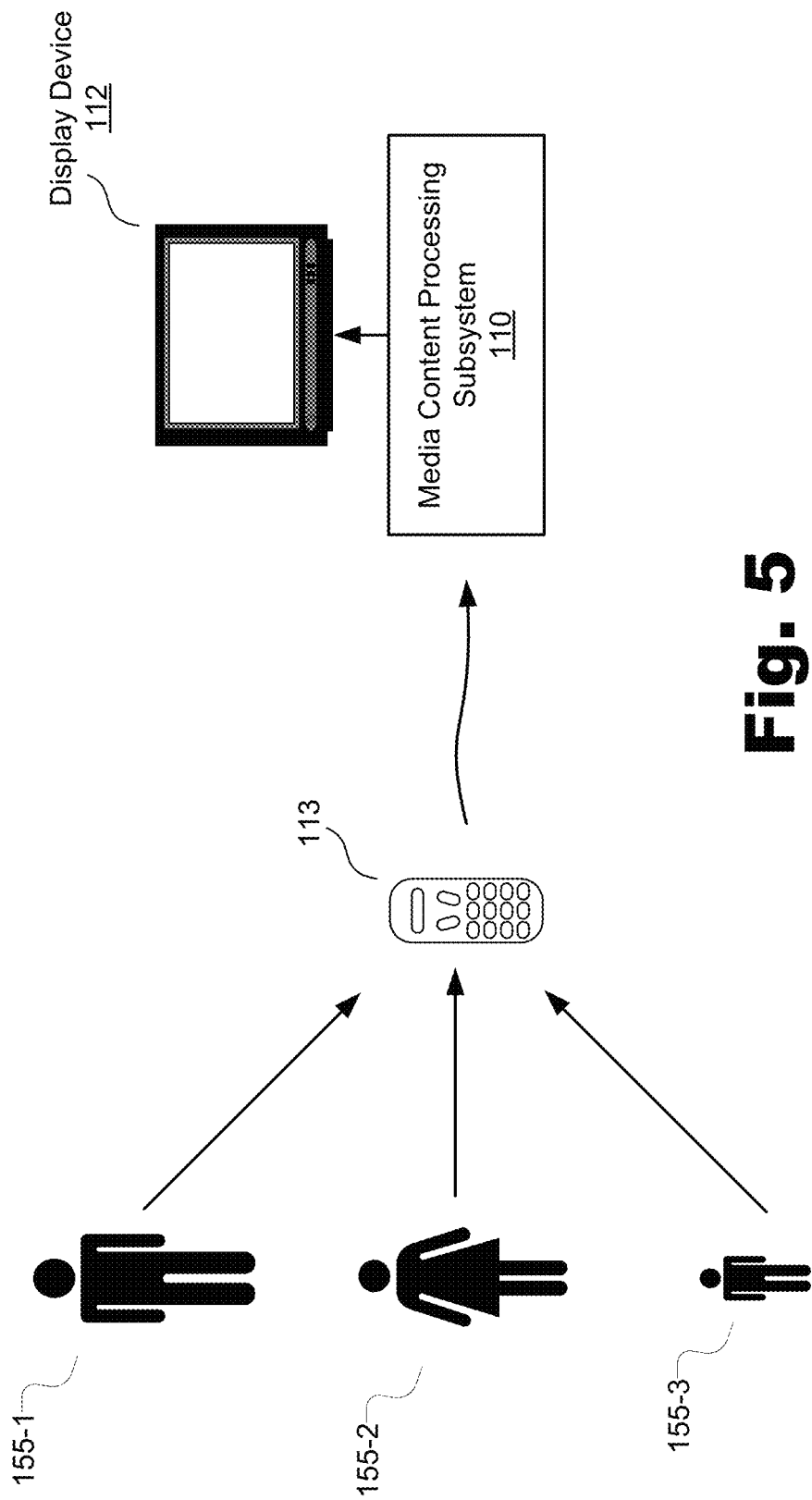
FIG. 5 illustrates an exemplary configuration wherein a single input device is used by multiple users to control a media content processing subsystem according to principles described herein.

FIG. 5 illustrates an exemplary configuration wherein a single input device 113 is used by multiple users (e.g., 155-1 through 155-3, collectively referred to herein as 155) to control the media content processing subsystem 110. The users 155 may include a father 155-1, mother 155-2, and/or child 155-3, for example. FIG. 5 shows three users 155 for illustrative purposes only. It will be recognized that any number of users may control the processing subsystem 110 with the input device 113 shown in FIG. 5.

In some examples, each user may have different viewing preferences and/or desire to access different media content instances via the processing subsystem 110. Additionally or alternatively, it may be desirable to restrict access to certain media content instances for a particular user (e.g., the child 155-3) or to completely restrict access to any of the functions of a processing subsystem 110 for one or more unauthorized users.

To this end, an input device 113 that controls a particular processing subsystem 110 may be configured to distinguish between various users thereof. In some examples, as will be described in more detail below, the input device 113 may be configured to acquire a fingerprint image corresponding to each user thereof and compare the acquired fingerprint image to one or more fingerprint images that are stored within a database. The fingerprint images stored within the database correspond to one or more authorized users each having a particular user profile associated therewith. In this manner, when a particular user uses the input device 113 to transmit a command to the processing subsystem 110, the processing subsystem 110 may execute the command in accordance with a user profile that has been established for that particular user. The database of fingerprint images will be described in more detail below.

In some examples, the input device 113 may be configured to acquire one or more fingerprint images when a user selects one or more of the control surfaces thereof. To illustrate, a number of exemplary input devices 113 configured to acquire one or more fingerprint images when a user selects one or more control surfaces thereof will now be described in more detail.

Figure 6:
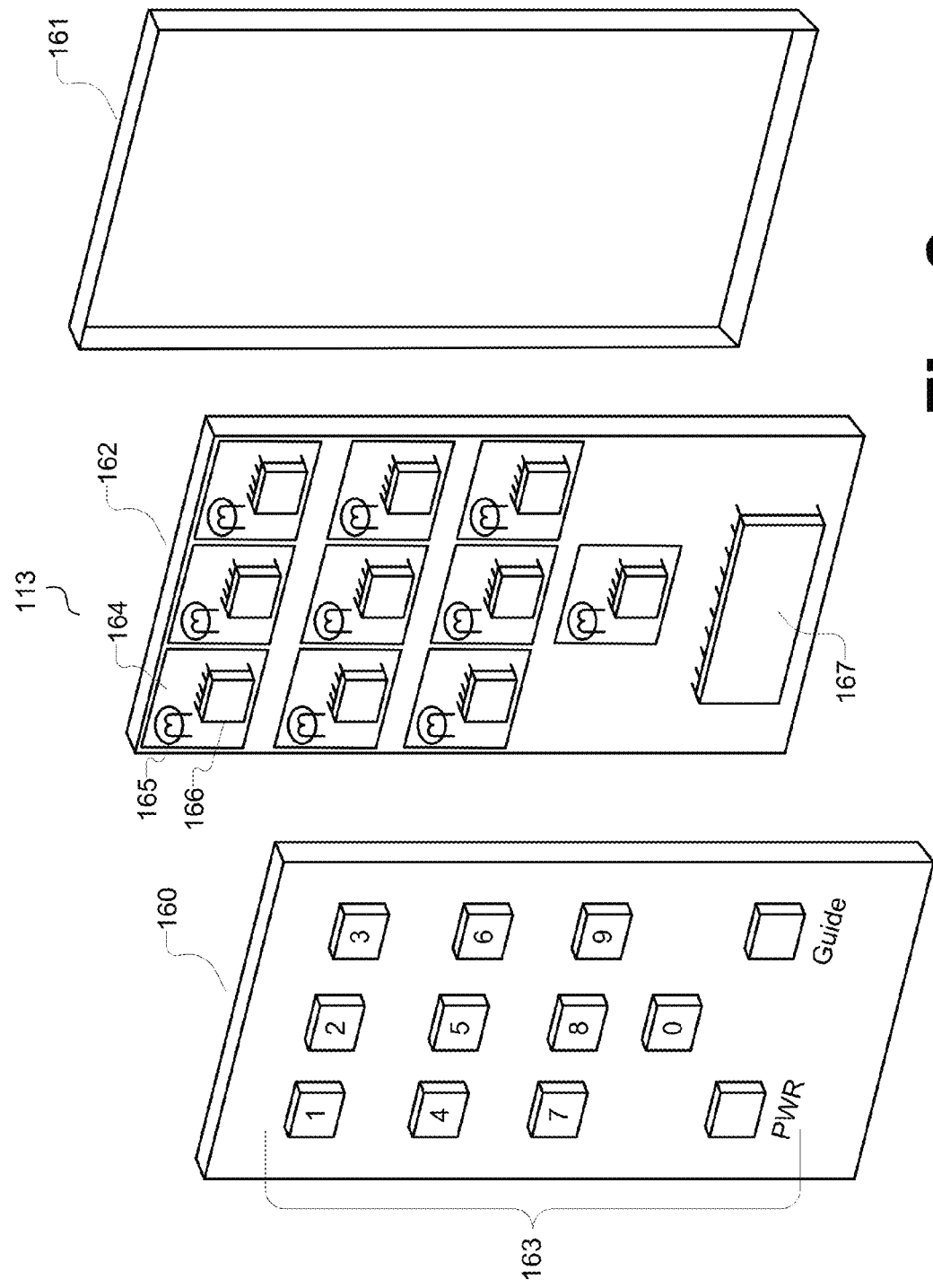
FIG. 6 illustrates an exploded perspective view of an exemplary input device configured to acquire a fingerprint image corresponding to each user thereof according to principles described herein.

An exploded perspective view of an exemplary input device 113 configured to acquire a fingerprint image corresponding to each user thereof is shown in FIG. 6. As shown in FIG. 6, the input device 113 includes a front panel 160 and a back panel 161 with a printed circuit board ("PCB") 162 disposed therebetween. The front and back panels 160 and 161 form an outer casing of the input device 113 and may be made out of any suitable material.

As shown in FIG. 6, a number of control surfaces 163 may be disposed on the front panel 160. It will be recognized that the control surfaces 163 shown in FIG. 6 are merely illustrative of the many different control surfaces that may be included within the input device 113.

The control surfaces 163 may include raised buttons or keys, as shown in FIG. 6. Each raised button or key may include one or more spring mechanisms, for example, to facilitate depression thereof. Additionally or alternatively, one or more of the control surfaces 163 may be substantially flush with the front panel 160.

In some examples, as shown in FIG. 6, the PCB 162 may include one or more fingerprint scanning subsystems 164 configured to optically acquire a fingerprint image when a finger touches and/or presses one or more of the control surfaces 163. It will be recognized that the number of fingerprint scanning subsystems 164 included within the input device 113 may vary as may serve a particular application. For example, the input device 113 may include a distinct fingerprint scanning subsystem 164 for each of the control surfaces 163. Alternatively, one or more of the fingerprint scanning subsystems 164 may each correspond to a plurality of control surfaces 163.

As shown in FIG. 6, each fingerprint scanning subsystem 164 may include one or more transmission sources 165 and one or more imaging components 166 configured to acquire an image of a fingerprint when a user selects a corresponding control surface 163. The imaging components 166 are further configured to transmit the acquired fingerprint image to an image processor 167 where the acquired fingerprint image is processed and compared to one or more fingerprint images that are stored within a database. The fingerprint scanning subsystem 164 and image processor 167 will be described in more detail below.

Figure 7:
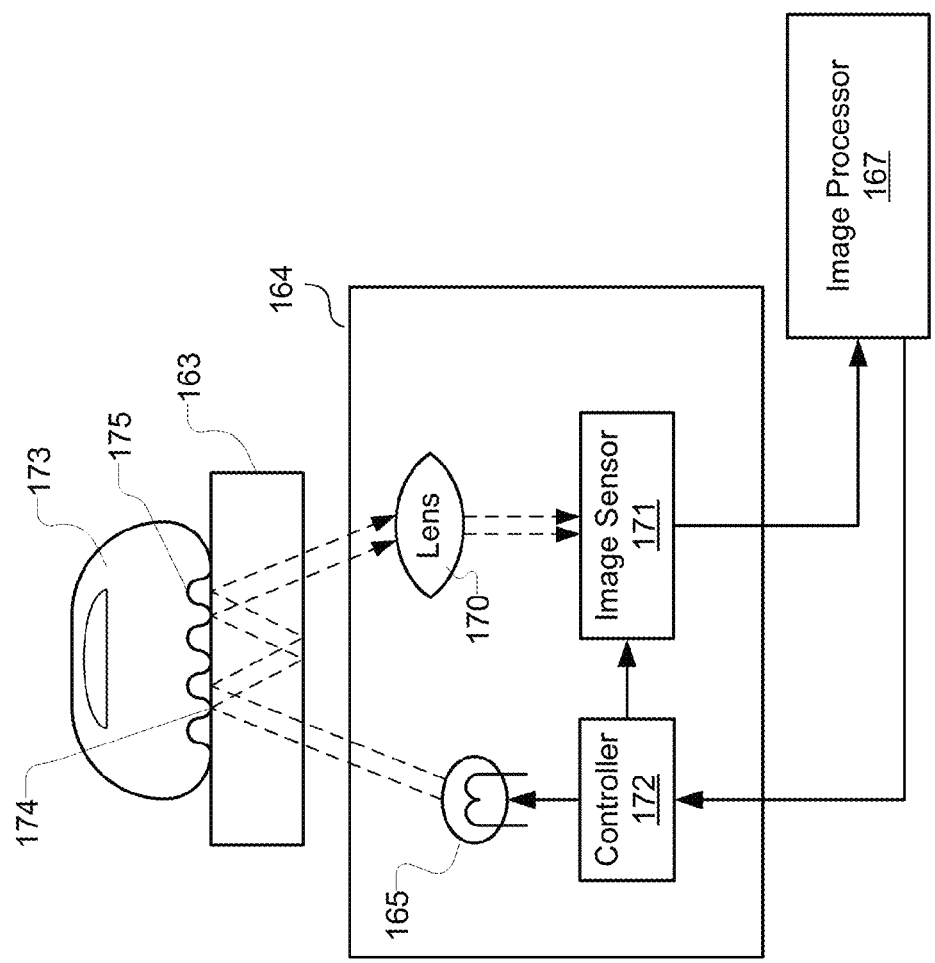
FIG. 7 illustrates a number of components that may be included within an exemplary fingerprint scanning subsystem according to principles described herein.

FIG. 7 illustrates a number of components that may be included within an exemplary fingerprint scanning subsystem 164. As shown in FIG. 7, the fingerprint scanning subsystem 164 may include the transmission source 165 described previously, a lens 170, an image sensor 171, and a controller 172 configured to control the operation of the transmission source 165 and the image sensor 171. Each of these components will be described in more detail below.

In some examples, the transmission source 165 is configured to direct one or more waves at a surface of a finger 173 when the finger 173 comes in contact with and/or presses a control surface 163 that corresponds to the fingerprint scanning subsystem 164. The waves may include light waves, infrared waves, optical waves, and/or any other type of wave configured to assist in the acquisition of a fingerprint image. The waves provided by the transmission source 165 are indicated by dotted lines in FIG. 7.

In the examples given herein, it will be assumed for illustrative purposes only that the transmission source 165 includes a light source configured to provide light that illuminates the surface of the finger 173 when the finger 173 comes in contact with and/or presses a control surface 163. The light source may include one or more light emitting diodes ("LEDs"), for example. However, it will be recognized that the transmission source 165 may include any other device configured to direct any other type of wave at the surface of the finger 173.

In some examples, the control surface 163 may include an at least translucent body made of glass, plastic, or any other suitable material configured to allow light to pass therethrough. In this manner, the light provided by the transmission source 165 may pass through the translucent body of the control surface 163 and reflect off the surface of the finger 173.

As shown in FIG. 7, the finger 173 includes a number of ridges 174 and valleys 175. Air layers exist in the valleys 175 of the finger 173. Hence, light reflects differently from the valleys 175 than from the ridges 174. As shown in FIG. 7, at least a portion of the light that reflects off each of the ridges 174 and valleys 175 exits the translucent body of the control surface 163 and into the lens 170.

In some examples, the lens 170 may be optically coupled to the translucent body of the control surface 163 with one or more optical links or cables. Alternatively, the lens 170 may be physically coupled to a bottom surface of the translucent body of the control surface 163.

The reflected light is then passed or directed from the lens 170 to the image sensor 171. In some alternative examples, the reflected light may be passed directly to the image sensor 171 via one or more optical fibers without the use of the lens 170.

The image sensor 171 may then acquire a fingerprint image (i.e., an image of at least a portion of one or more ridges 174 and valleys 175 of the bottom surface of the finger 173) based on the reflected light.

The image sensor 171 may include any combination of hardware, software, and/or firmware as may serve a particular application. For example, the image sensor 171 may include a charge coupled device ("CCD") coupled to an analog-to-digital converter. The CCD may include a number of photosites, or light-sensitive diodes, each configured to generate an electrical signal in response to light photons. The electrical signals generated by the photosites collectively form an image of the ridges 174 and valleys 175 of the finger 173. The analog-to-digital converter may then process the electrical signals to generate a digital representation of the image. Additional or alternative image sensors 171 that may be used in accordance with the systems and methods described herein include, but are not limited to, photosensors, CMOS devices, and/or any other optical imaging device.

The controller 172 shown in FIG. 7 is configured to control the operation of the transmission source 165 and/or the image sensor 171. For example, the controller may be configured to turn the transmission source 165 on or off and/or adjust the exposure time of the image sensor 171. It will be recognized that the controller 172 may include any combination of hardware, software, and/or firmware and may be configured to perform additional or alternative functions as may serve a particular application.

As shown in FIG. 7, the fingerprint image acquired by the image sensor 171 is transmitted to an image processor 167. The image processor 167 may include any combination of hardware, software, and/or firmware as may serve a particular application. In some examples, the image processor 167 is located within the input device 113, as shown in FIG. 6. Alternatively, the image processor 167 may be located within the processing subsystem 110 or within any other device configured to communicate with the input device 113.

In some examples, the image processor 167 is configured to analyze the fingerprint image acquired by the image sensor 171 to determine whether the fingerprint image is acceptable for further processing. To this end, the image processor 167 may assess average pixel darkness and reject the acquired fingerprint image if the image is too dark or too light. If the fingerprint image is rejected, the image processor 167 may cause the controller 172 to adjust the settings of the transmission source 165 and/or the image sensor 171 and reacquire the fingerprint image. It will be recognized that the minimum level of resolution and/or detail included within an acquired fingerprint image that is considered to be acceptable for further processing may vary as may serve a particular application.

Once an acceptable fingerprint image has been acquired by the image sensor 171, the image processor 167 compares the acquired fingerprint image to a number of fingerprint images that are stored within a database. Each fingerprint image stored within the database is associated with a particular user profile. If the image processor 167 determines that the acquired fingerprint image matches a particular fingerprint image within the database, the image processor 167 may cause the processing subsystem 110 to execute a command transmitted by the user input device 113 in accordance with a user profile that is associated with the matching fingerprint image.

Figure 8:
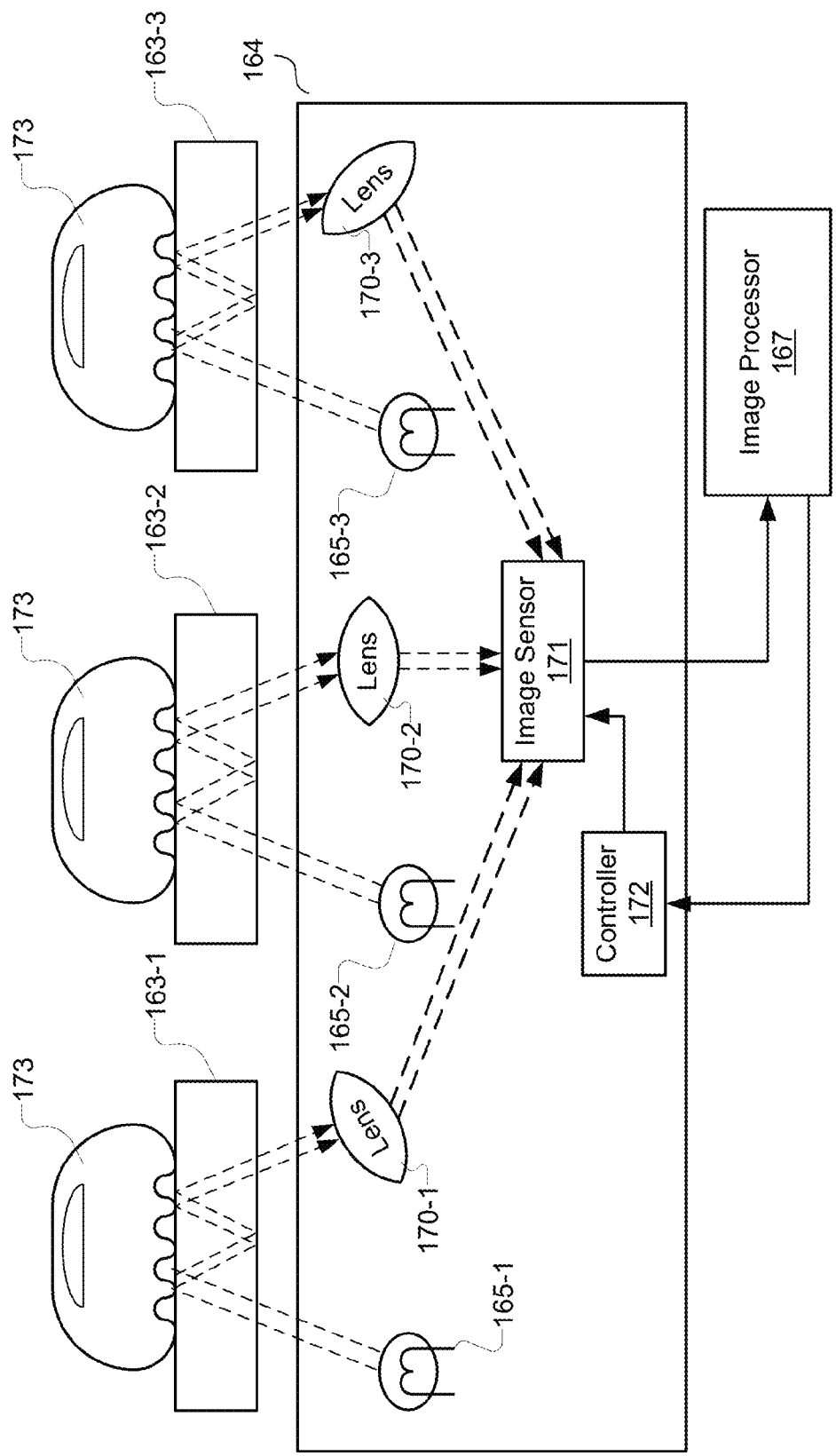
FIG. 8 illustrates an exemplary configuration wherein a single fingerprint scanning subsystem corresponds to multiple control surfaces according to principles described herein.

FIG. 8 illustrates an exemplary configuration wherein a single fingerprint scanning subsystem 164 corresponds to multiple control surfaces (e.g., 163-1 through 163-3, collectively referred to herein as 163). In other words, the fingerprint scanning subsystem 164 shown in FIG. 8 is configured to optically acquire a fingerprint image when a finger 173 touches any one of the multiple control surfaces 163.

In some examples, the fingerprint scanning subsystem 164 of FIG. 8 may include a distinct transmission source (e.g., 165-1 through 165-3, collectively referred to herein as 165) corresponding to each control surface 163. In some alternative examples, a single transmission source 165 may be used to illuminate a plurality of the control surfaces 163 shown in FIG. 8.

Each control surface 163 may additionally or alternatively have a corresponding lens (e.g., 170-1 through 170-3, collectively referred to herein as 170) within the fingerprint scanning subsystem 164. As shown in FIG. 8, each lens 170 may be angled towards the image sensor 171 so as to direct the reflected light thereto. In this manner, a single image sensor 171 may be used to acquire a fingerprint image originating from a number of different control surfaces 163.

Figure 9:
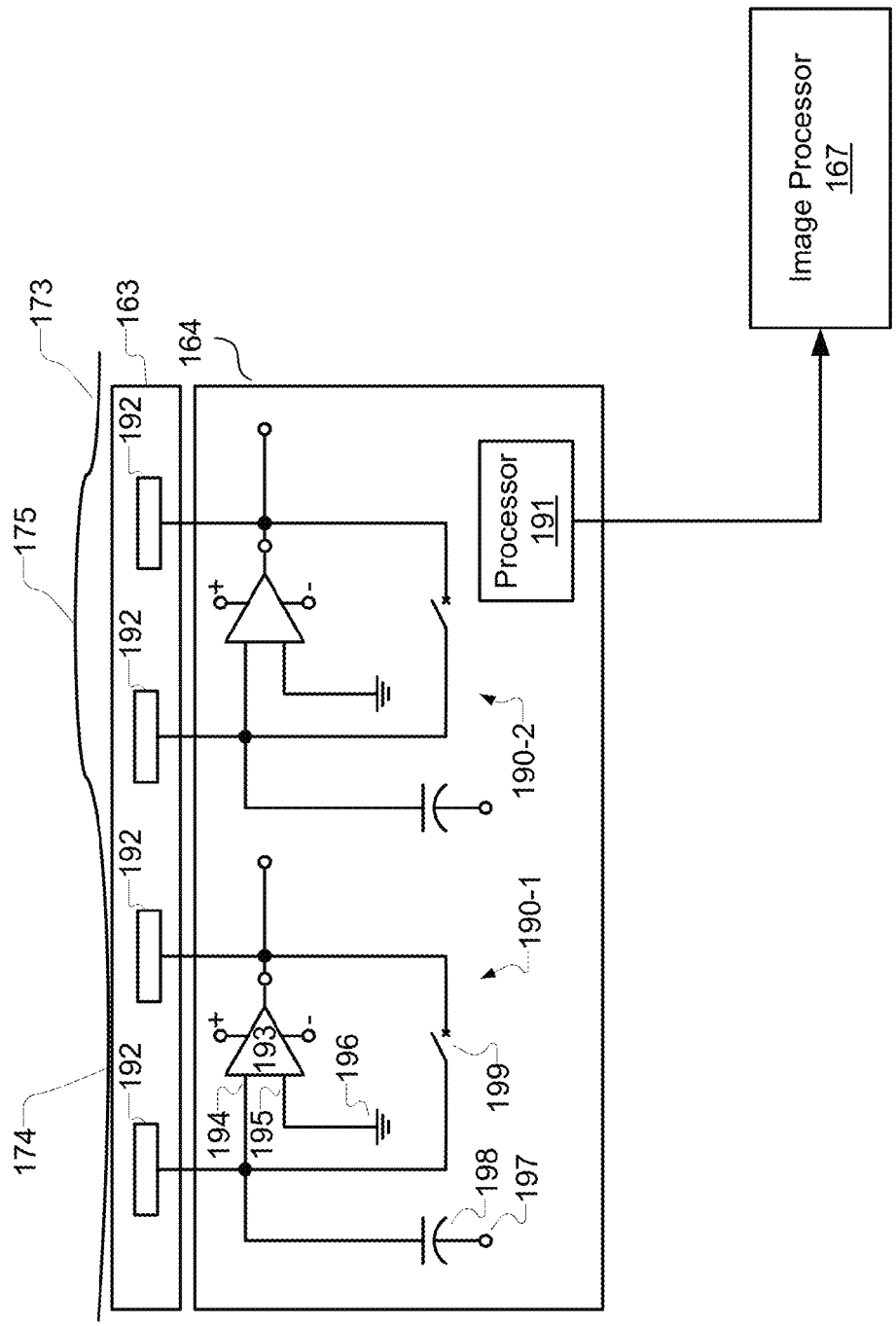
FIG. 9 illustrates an alternative fingerprint scanning subsystem configured to capacitively acquire a fingerprint image when a finger touches or presses a control surface according to principles described herein.

FIG. 9 illustrates an alternative fingerprint scanning subsystem 164 configured to capacitively acquire a fingerprint image when a finger touches or presses a control surface 163. As shown in FIG. 9, the fingerprint scanning subsystem 164 may include a number of integrator circuits (e.g., 190-1 and 190-2, collectively referred to herein as 190) and a processor 191 configured to control the integrator circuits 190. The processor 191 may include any combination of hardware, software, and/or firmware as may serve a particular application.

As shown in FIG. 9, each integrator circuit 190 is coupled to two conductor plates 192. In some examples, the conductor plates 192 are located within an insulative body of the control surface 163. Alternatively, the conductor plates may be located beneath the body of the control surface 163.

The distance between each conductor plate 192 is relatively small. In some instances, for example, the distance between each conductor plate 192 is less than or equal to a width of a finger ridge 174 or a finger valley 175.

As shown in FIG. 9, each integrator circuit 190 may include an inverting operational amplifier 193 having an inverting terminal 194 and a non-inverting terminal 195. The non-inverting terminal 195 is electrically coupled to ground 196. The inverting terminal 194 is electrically coupled to an input reference voltage 197 in series with an input capacitor 198, a feedback loop including two of the connector plates 192, and a reset switch 199.

It will be recognized that the two conductor plates 192 included within the feedback loop form a basic capacitor capable of storing charge. In some examples, the surface of the finger 173 acts as a third capacitor pate, separated by the insulating layer within the control surface 163 and, in the case of fingerprint valleys 175, a pocket of air. Varying the distance between the capacitor plates (e.g., by moving the finger 173 closer or farther away from the conductor plates 192) changes the total capacitance of the capacitor formed by the conductor plates 192. Hence, the capacitance between two conductor plates 192 underneath a ridge 174 will be greater than the capacitance between two conductor pates 192 underneath a valley 175.

To acquire a fingerprint image, the processor 191 first resets each integrating circuit 190 by closing and then opening each of the reset switches 199. Charge is then applied to the integrator circuits 190, some of which accumulates on each pair of conductor plates 192. The capacitance between each pair of conductor plates 192 is dependent on this charge and on the ridges 174 and valleys 175 that are a part of the finger 173. The capacitance between each pair of conductor plates 192, in turn, affects the output voltage of each amplifier 193. Hence, the processor 191 may read the voltage output of each amplifier 193 and determine whether each voltage output corresponds to a ridge 174 or to a valley 175. In this manner, the processor 191 may generate an overall image of the fingerprint.

The processor 191 may then transmit the acquired fingerprint image to the image processor 167. The image processor 167, as described above, may be configured to determine whether the fingerprint image is acceptable for further processing and/or compare the acquire fingerprint image to a number of fingerprint images that are stored within a database.

In some examples, a fingerprint image is acquired and compared to the fingerprint images stored within the database each time a user selects a control surface 163. In some alternative examples, the fingerprint scanning subsystem 164 and/or the image processor 167 may be configured to periodically acquire and compare fingerprint images to the fingerprint images within the database. The frequency of this periodic acquisition and comparison may vary as may serve a particular application. For example, a pre-determined time period may be allowed to pass after an initial acquisition of a fingerprint image before a subsequent fingerprint image is acquired by the fingerprint scanning subsystem 164. During this pre-determined time period, the processing subsystem 110 may be configured to execute one or more commands transmitted thereto from the input device 113 in accordance with a user profile that corresponds to the initially acquired fingerprint image.

The database of fingerprint images described herein may be located within a storage medium that is a part of the input device 113. For example, the input device 113 may include a hard drive, flash memory module, or any other storage medium configured to store the fingerprint image database. Alternatively, the fingerprint image database may be stored within the storage device 134 or memory 135 located within the processing subsystem 110. In yet another alternative example, the fingerprint image database may be stored within a storage medium that is located within any other device communicatively coupled to the processing subsystem 110.

In some examples, as shown in FIG. 10, the processing subsystem 110 may be configured to display a GUI 200 that is configured to allow a user to enter one or more fingerprint images into the database and/or associate one or more of the fingerprint images that are within the database with one or more user profiles. As shown in FIG. 10, the GUI 200 may include a listing of each of the fingerprint images included within the database, a name of the particular user corresponding to each of the fingerprint images, and a name of the particular user profile corresponding to each of the user profiles.

For example, the GUI 200 shown in FIG. 10 may indicate that the fingerprint image database includes five entries. As shown in FIG. 10, the first fingerprint image corresponds to a user named "Mike" and to a user profile labeled "Full Access". The second fingerprint image corresponds to a user named "Sally" and to a user profile labeled "Sally's Profile". The next two fingerprint images correspond to the same user "John" and to a user profile labeled "Child". The last fingerprint image corresponds to a user named "Sarah" and to a user profile labeled "Teen". It will be recognized that the entries shown in FIG. 10 are merely illustrative and that they may be added to or otherwise modified as may serve a particular application.

In some examples, a user may enter a fingerprint image into the fingerprint image database and/or assign a particular user name and user profile to one or more fingerprint images already in the database. Any suitable method may be used to add a fingerprint image to the database. For example, a user may select the "Add" button shown in FIG. 10 and then touch or press a pre-determined control surface 163 on the input device 113. A fingerprint scanning subsystem 164 may then acquire the fingerprint image and transmit the fingerprint image to the image processor 167 for addition to the database.

In some examples, a user may additionally associate a default user profile with a set of fingerprint images that are not included within the database. In this manner, a user who does not typically use the processing subsystem 110 (e.g., a guest) may still access media content via the processing subsystem 110. However, any command transmitted by that user to the processing subsystem 110 will be executed in accordance with the default user profile.

Each user profile described herein may include various settings, permissions, and/or restrictions. A number of exemplary settings that may be a part of a user profile will now be described.

Figure 11:
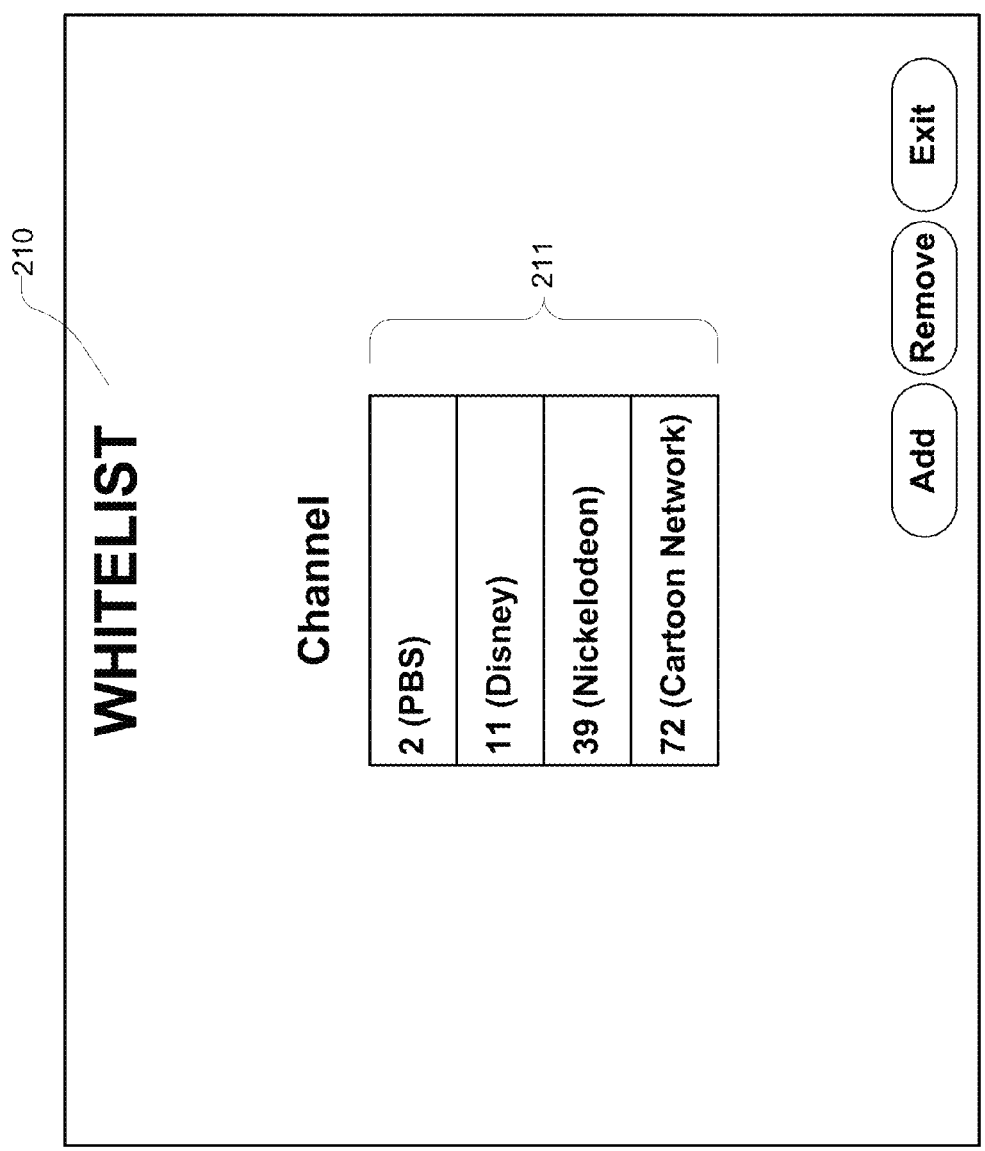
FIG. 11 illustrates an exemplary whitelist that may be a part of a particular user profile according to principles described herein.

FIG. 11 illustrates an exemplary whitelist 210 that may be a part of a particular user profile. In some examples, the whitelist 210 may be displayed by the processing subsystem 110 as a GUI and may include an editable listing 211 of a number of channels that may be accessed by a user while the processing subsystem 110 is operating within the user profile. The listing 211 shown in FIG. 11 includes four channels (channels 2, 11, 39, and 72) for illustrative purposes only. It will be recognized that the whitelist 210 may be edited to include any number of channels as may serve a particular user profile.

In some examples, a user having a fingerprint associated with a particular user profile that includes the whitelist 210 may access only those channels listed within the whitelist 210. In this manner, for example, a parent may create a whitelist, such as whitelist 210, that lists channels that the parent deems appropriate for a child. The parent may then assign the whitelist 210 to a user profile associated with one or more fingerprints of the child. In this manner, when the child selects a particular control surface 163 that is part of the user input device 113, the processing subsystem 110 recognizes the fingerprint of the child and performs the corresponding command in accordance with the rules specified in the whitelist 210.

Hence, if the child presses channel up or channel down on the input device 113, for example, the processing subsystem 110 skips channels not listed within the whitelist 210 and causes the display device 112 to display content associated with one of the channels listed within the whitelist 210. If the child tries to specifically key in the number of a channel that is not listed within the whitelist 210, the processing subsystem 110 may be configured to ignore the command, display an error message, or otherwise indicate to the child that the keyed-in channel is not accessible.

In some examples, the whitelist 210 may additionally or alternatively include an editable listing of one or more media content instances, one or more media content ratings, and/or any other rules that specify one or more media content instances that may be accessed by a user while within the corresponding user profile.

Figure 12:
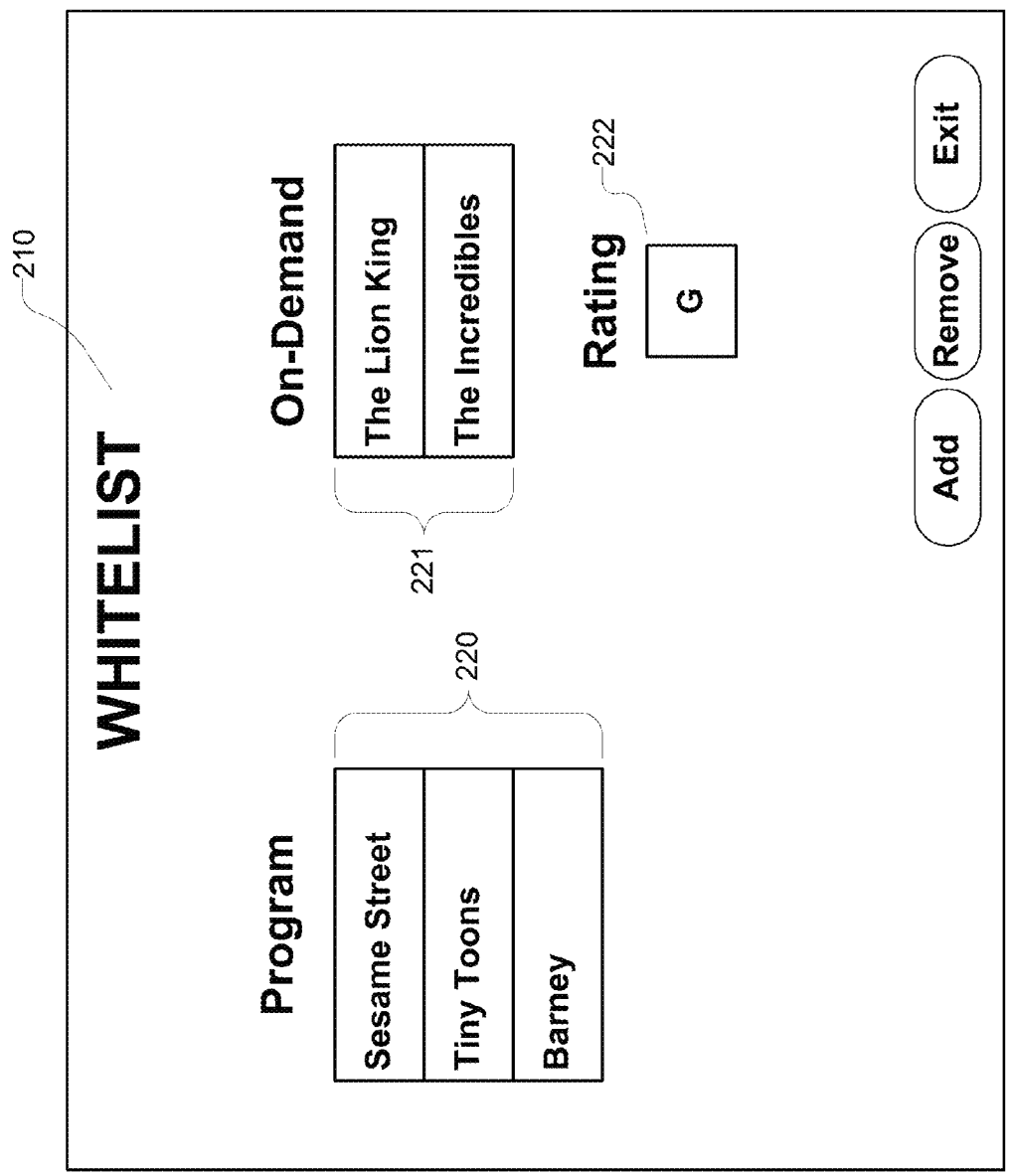
FIG. 12 illustrates another exemplary whitelist that may be a part of a particular user profile according to principles described herein.

For example, FIG. 12 shows that the whitelist 210 may include a number of specific media content instances 220 and 221 and allowable content ratings 222. A user having a fingerprint assigned to a particular user profile that includes the whitelist 210 shown in FIG. 12 may access only those media content instances listed within the whitelist 210 or media content instances with a content rating of "G". It will be recognized that any number of media content instances and/or content ratings may be listed within the whitelist 210 as may serve a particular user profile.

Figure 13:
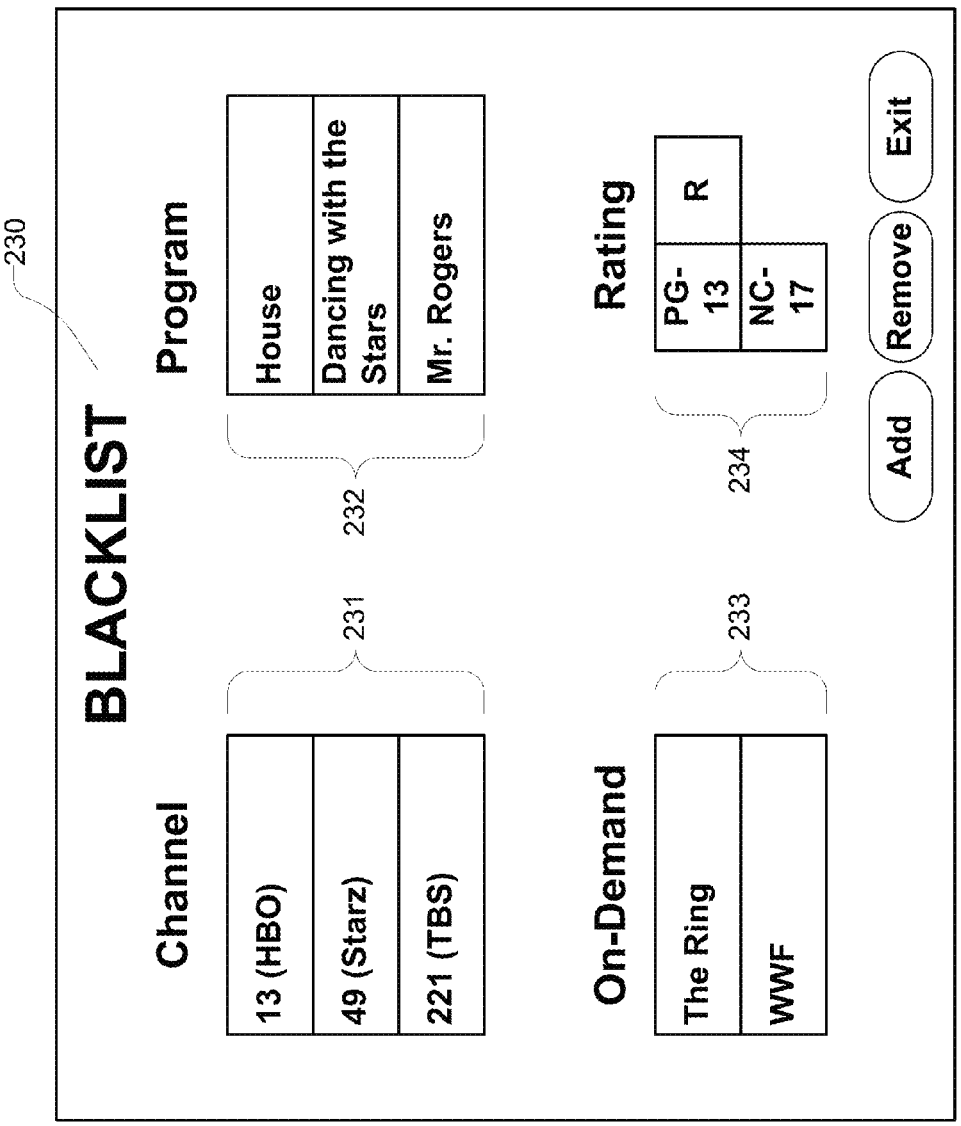
FIG. 13 illustrates an exemplary blacklist that may be a part of a particular user profile according to principles described herein.

A user profile may additionally or alternatively include a blacklist specifying one or more media content access restrictions. For example, FIG. 13 illustrates an exemplary blacklist 230 that may be a part of a particular user profile and that may be displayed as a GUI on the viewing screen of the display device 112. In some examples, the blacklist 230 may include an editable listing of channels 231, specific media content instances 232 and 233, and content ratings 234 that are blocked or prevented from being accessed while within the user profile. The contents of the blacklist 230 may be edited to include any additional or alternative listing as may serve a particular user profile.

In some examples, a user having a fingerprint assigned to a particular user profile that includes the blacklist 230 may be blocked from accessing any media content instance specified by the entries contained within the blacklist 230. For example, a user having a fingerprint assigned to a user profile that includes the blacklist 230 shown in FIG. 13 is blocked from accessing any of the channels listed within the blacklist 230 (e.g., HBO, STARZ, and TBS), any of the specific media content instances 232 and 233 listed within the blacklist 230 (e.g., HOUSE, DANCING WITH THE STARS, MR. ROGERS, THE RING, and WWF), or any media content instance having any of the ratings 234 listed within the blacklist (e.g., PG-13, R, and NC-17).

Figure 14:
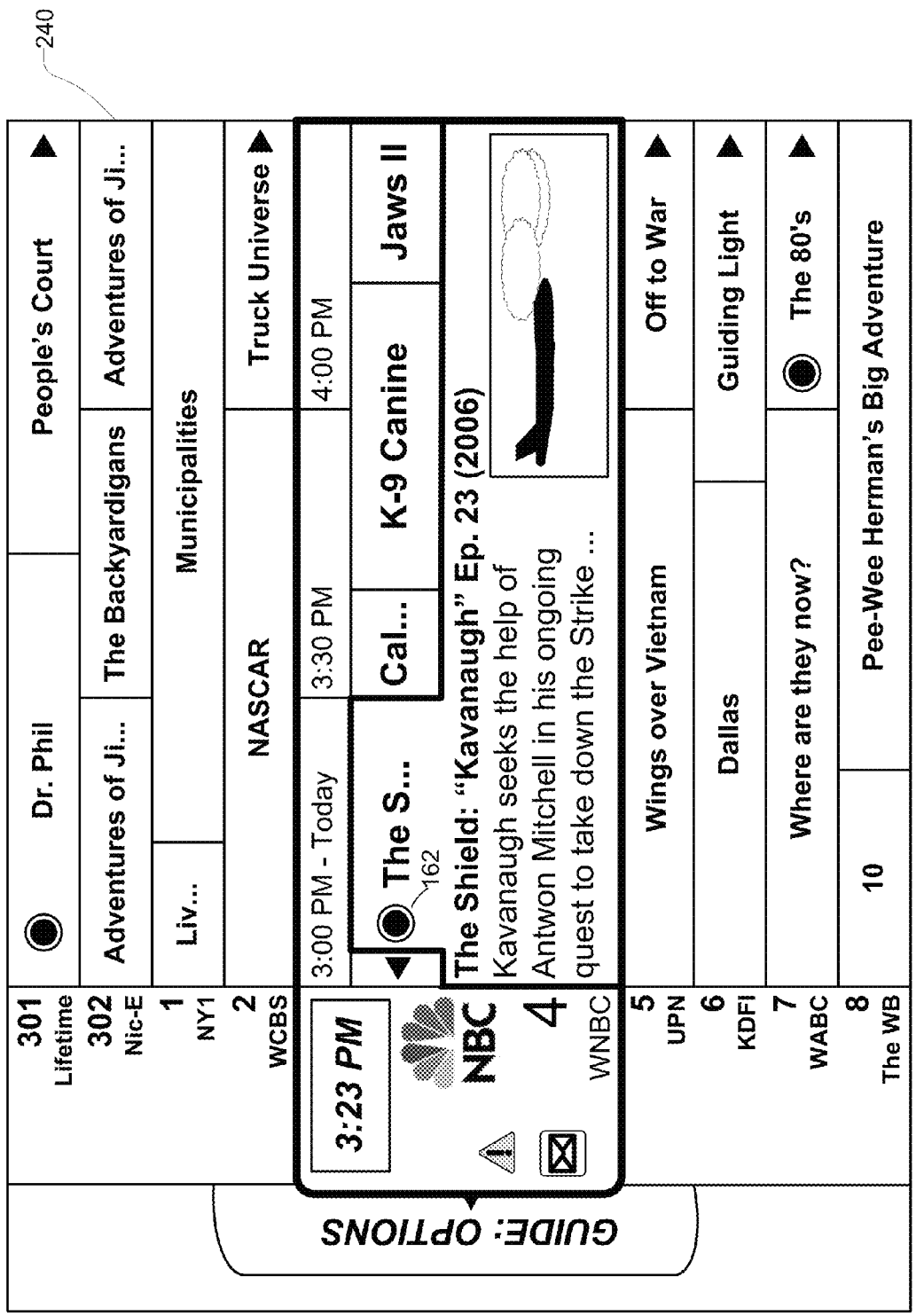
FIG. 14 illustrates an exemplary program guide graphical user interface that may be displayed by the display device according to principles described herein.

A user profile may also include one or more customized display settings. For example, a user profile may specify a particular layout of a program guide GUI. FIG. 14 illustrates an exemplary program guide GUI 240 that may be displayed by the display device 112. As shown in FIG. 14, the program guide GUI 240 may be configured to display detailed program information corresponding to a number of media content instances that may be accessed via the processing subsystem 110. The detailed program information may include, but is not limited to, start and stop times, titles, plot summaries, and various graphics related to one or more of the media content instances.

However, some users may desire to only view a limited number of items within a program guide GUI 240. Moreover, in some instances, a parent or other user may desire to limit the program information displayed within the program guide GUI 240 when the program guide GUI 240 is accessed by a child. Hence, in some examples, the contents of the program guide GUI 240 may be specified and included as a part of a particular user profile that is associated with a particular fingerprint.

Figure 15:
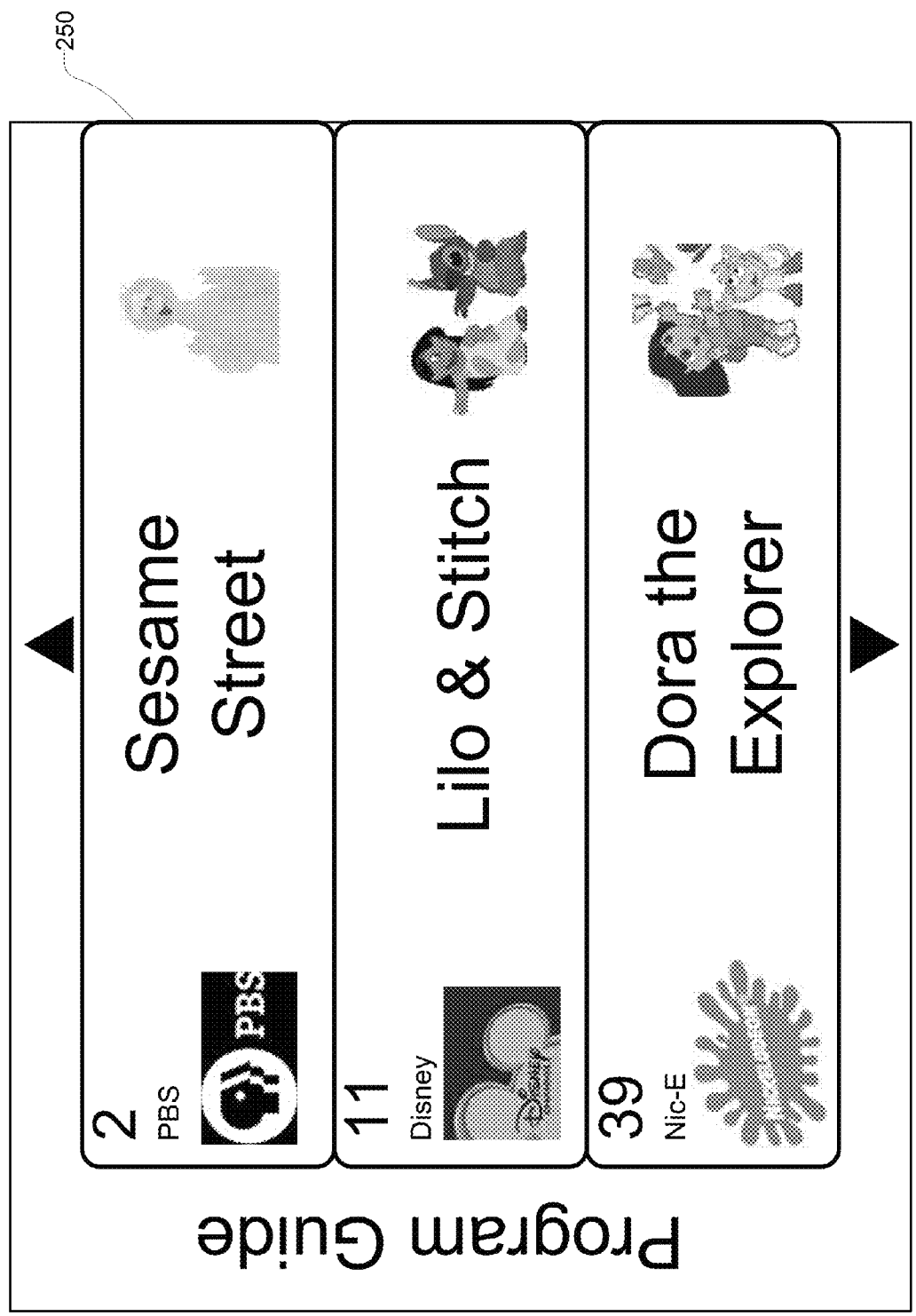
FIG. 15 illustrates an exemplary program guide graphical user interface that may be a part of a user profile created for a child according to principles described herein.

For example, FIG. 15 illustrates an exemplary program guide GUI 250 that may be a part of a user profile created for a child. It will be recognized that the program guide GUI 250 is simplified in comparison to the program guide GUI 240 illustrated in FIG. 14. As shown in FIG. 15, the simplified program guide GUI 250 may be configured to display only the channel numbers and logos, a number of media content instance titles, and/or a number of graphics corresponding to the media content instance titles. However, it will be recognized that the program guide GUI 250 shown in FIG. 15 may be configured to display any type of program information as may serve a particular user profile.

Figure 16:
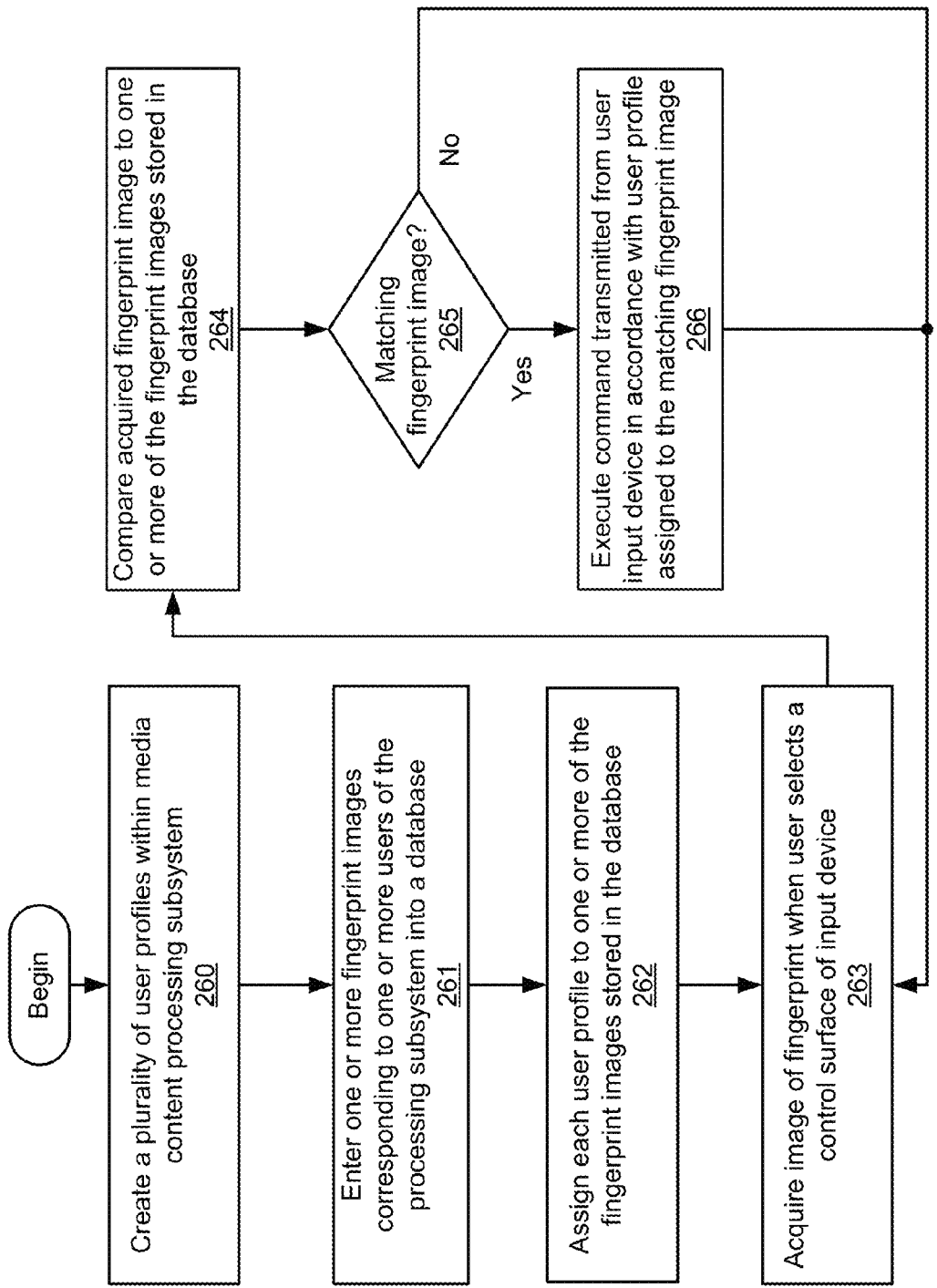
FIG. 16 illustrates an exemplary method of providing access to one or more media content instances that may be available via the media processing subsystem according to principles described herein.

FIG. 16 illustrates an exemplary method of providing access to one or more media content instances that may be available via the media processing subsystem 110. The steps shown in FIG. 16 are merely illustrative and may be omitted, added to, reordered, and/or modified in any way.

In step 260, a plurality of user profiles are created within the media content processing subsystem 110. The user profiles may include any customized setting related to media content that is accessible via the processing subsystem 110.

One or more fingerprint images corresponding to one or more users of the processing subsystem 110 are then entered into a database, as shown in step 261. Next, each of the user profiles is assigned to one or more of the fingerprint images stored within the database, as shown in step 262.

A user may then transmit a command to the processing subsystem 110 by selecting a control surface 163 that is a part of the input device 163. When the user selects the control surface 163, a fingerprint scanning subsystem 164 acquires an image of the fingerprint of the user, as shown in step 263. In step 264, the acquired fingerprint image is compared to one or more of the fingerprint images stored within the database.

In step 266, if it is determined that the acquired fingerprint image matches one of the fingerprint images within the database (Yes, step 265), the processing subsystem 110 executes the command transmitted from the user input device 113 in accordance with a user profile that is assigned to the matching fingerprint image.

As shown in FIG. 16, a fingerprint image may be acquired and compared to one or more of the fingerprint images stored within the database each time a user selects a new control surface 163.

The preceding description has been presented only to illustrate and describe embodiments of the invention. It is not intended to be exhaustive or to limit the invention to any precise form disclosed. The invention may be practiced otherwise than is specifically explained and illustrated without departing from its spirit or scope. It is intended that the scope of the invention be defined by the following claims.

What is claimed is:

1. A system comprising:
a media content processing subsystem; and
an input device having a plurality of control surfaces, each of said plurality of control surfaces configured to cause said input device to transmit at least one command to said processing subsystem, wherein said input device is configured to acquire an image of a fingerprint of a finger touching a first control surface of said plurality of control surfaces and cause said processing subsystem to execute a command corresponding to said first control surface in accordance with a user profile that matches to said acquired fingerprint image;
a fingerprint scanning subsystem having a plurality of lenses and an image sensor in communication with said plurality of lenses, each of said plurality of lenses corresponding to one of said plurality of control surfaces, the fingerprint scanning subsystem configured to acquire said image of said fingerprint, analyze a quality of said acquired fingerprint image based at least in part on whether said quality is acceptable for a particular application associated with said control surface through which said fingerprint image was acquired to determine whether said acquired image is acceptable for further processing, the fingerprint subsystem being further configured to adjust settings on the fingerprint subsystem and to reacquire a revised fingerprint image if said acquired fingerprint image is unacceptable for said further processing.

2. The system of claim 1, wherein:
said input device is further configured to acquire another fingerprint image of a fingerprint touching a second control surface of said plurality of control surfaces and cause said media content processing subsystem to execute another command corresponding to said second control surface in accordance with a user profile that matches to said another acquired fingerprint image, and
wherein said first control surface has a first spring mechanism and said second control surface has a second spring mechanism.

3. The system of claim 1, further comprising:
a storage medium configured to store a database of one or more fingerprint images each having a matching user profile; and
an image processor;
wherein said image processor is configured to
determine whether said acquired fingerprint image matches one of said fingerprint images within said database; and
when said acquired fingerprint matches a corresponding fingerprint image from said fingerprint images within said database, select a user profile that matches the corresponding fingerprint image.

4. The system of claim 3, wherein said image processor is located within said input device.

5. The system of claim 1, wherein there is a distinct fingerprint scanning subsystem for each control surface of said control surfaces.

6. The system of claim 1, wherein said fingerprint scanning subsystem comprises:
a transmission source configured to illuminate a surface of said finger touching said control surface that is a translucent body configured to allow passage of said light therethrough such that said light reflects off of the surface of the finger; and
wherein said image sensor is configured to optically acquire said image of said fingerprint while the surface of the finger is illuminated by said transmission source.

7. The system of claim 1, wherein said fingerprint scanning subsystem comprises:
a plurality of conductor plates, at least one of said plurality of conductor plates being beneath a body portion of at least one of said plurality of control surfaces;
a plurality of integrator circuits electrically coupled to said plurality of conductor plates; and
a processor configured to control an operation of said integrator circuits;
wherein said processor is configured to cause said integrator circuits and said conductor plates to capacitively acquire said fingerprint image.

8. The system of claim 1, wherein said user profile that matches to said acquired fingerprint image comprises at least one setting configured to customize an interaction between a user and said media content processing subsystem.

9. The system of claim 8, wherein said at least one setting comprises a whitelist specifying at least one accessible media content instance, wherein only media content instances specified by the whitelist are accessible.

10. The system of claim 1, wherein said user profile causes execution of said command in accordance with criteria selected from the group of criteria consisting of (a) permitting said user access to a media content instance, (b) restricting said user from accessing said media content instance, (c) providing a customized display of said media content instance and (d) providing a customized program guide.

11. The method of claim 1, wherein said first control surface is a single control surface.

12. The method of claim 1, wherein said fingerprint scanning subsystem includes a transmission source that is located below said first control surface.

13. An apparatus comprising:
a transmitter configured to communicate with a media content processing subsystem;
a plurality of control surfaces each configured to cause said transmitter to transmit at least one command to said processing subsystem; and
a fingerprint scanning subsystem having a plurality of lenses and an image sensor in communication with said plurality of lenses, each of said plurality of lenses corresponding to one of said plurality of control surfaces, the fingerprint scanning subsystem configured to acquire an image of a fingerprint, analyze a quality of said acquired fingerprint image to determine whether said fingerprint image is acceptable for further processing based at least in part on whether the quality is acceptable for a particular application associated with at least one control surface where said fingerprint image was acquired, the finger scanning subsystem being further configured to adjust settings and reacquire a revised fingerprint image if said acquired fingerprint image is unacceptable for said further processing;
wherein said transmitter is configured to determine a command corresponding to said at least one control surface, and cause said processing subsystem to execute said command corresponding to said at least one control surface in accordance with a user profile that matches to said acquired fingerprint image.

14. The apparatus of claim 13, wherein said fingerprint scanning subsystem is further configured to acquire another fingerprint image of a fingerprint touching another control surface of said control surfaces and cause said media content processing subsystem to execute another command corresponding to said another control surface in accordance with a user profile that matches to said another acquired fingerprint image.

15. The apparatus of claim 13, further comprising:
a storage medium configured to store a database of one or more fingerprint images and one or more matching user profiles; and
an image processor;
wherein said image processor is configured to
determine whether said acquired fingerprint image matches a database fingerprint image within said database; and
when said acquired fingerprint matches one of said database fingerprint images, select a user profile that matches the database fingerprint image.

16. The apparatus of claim 13, wherein said fingerprint scanning subsystem comprises a distinct fingerprint scanning subsystem for each of said plurality of control surfaces.

17. The apparatus of claim 13, wherein said fingerprint scanning subsystem comprises:
a transmission source configured to illuminate a surface of said finger touching said at least one control surface that is a translucent body configured to allow passage of said light therethrough such that said light reflects off of the surface of the finger; and
wherein said image sensor is configured to optically acquire said image of said fingerprint while the surface of the finger is illuminated by said transmission source.

18. The apparatus of claim 13, wherein said at least one fingerprint scanning subsystem comprises:
a plurality of conductor plates, at least one of said plurality of conductor plates being beneath a body portion of at least one of said plurality of control surfaces;
a plurality of integrator circuits electrically coupled to said plurality of conductor plates; and
a processor configured to control an operation of said integrator circuits;
wherein said processor is configured to cause said integrator circuits and said conductor plates to capacitively acquire said fingerprint image.

19. The apparatus of claim 13, wherein said user profile that matches to said acquired fingerprint image comprises at least one setting configured to customize an interaction between a user and said media content processing subsystem.

20. The apparatus of claim 19, wherein said at least one setting comprises a whitelist specifying at least one accessible media content instance, wherein only media content instances specified by the whitelist are accessible.

21. A method comprising:
providing an input device having a plurality of control surfaces and a fingerprint scanning subsystem having a plurality of lenses and an image sensor in communication with said plurality of lenses, each of said plurality of lenses corresponding to one of said plurality of control surfaces, each of said plurality of control surfaces configured to cause said input device to transmit at least one command to a processor that is configured to provide access to at least one media content instance through a media content provider, wherein said input device acquires fingerprints from each of said plurality of control surfaces;
acquiring an image of a fingerprint of a finger touching at least one control surface of said plurality of control surfaces;
analyzing a quality of said acquired fingerprint image to determine whether said fingerprint image is acceptable for further processing based at least in part on whether the quality is acceptable for a particular application associated with at least one control surface through which the fingerprint image was acquired;
adjusting settings and reacquiring a revised fingerprint image if said fingerprint image is unacceptable for further processing;
determining a command corresponding to said at least one control surface; and
executing the command as indicated by said at least one control surface in accordance with a user profile that matches to said acquired fingerprint image.

22. The method of claim 21, further comprising:
providing a database of one or more fingerprint images and one or more corresponding user profiles;
determining whether said acquired fingerprint image matches a database fingerprint image of said fingerprint images within said database; and
selecting, when said acquired fingerprint matches said database fingerprint, a user profile that matches the database fingerprint image.

23. The method of claim 21, wherein said step of acquiring said image of said fingerprint comprises optically acquiring the image of the fingerprint.

24. The method of claim 21, wherein said step of acquiring said image of said fingerprint comprises capacitively acquiring the image of the fingerprint using a plurality of conductor plates, at least one of said plurality of conductor plates being beneath a body portion of at least one of said plurality of control surfaces.

* * * * *